United States Patent [19]

Fernandes et al.

[11] Patent Number: 5,253,345
[45] Date of Patent: Oct. 12, 1993

[54] POINT OF SALE REGISTER SYSTEM

[75] Inventors: Anthony J. Fernandes, Villa Park; William P. Smead, Palatine, both of Ill.

[73] Assignee: Sears, Roebuck & Co., Hoffman Estates, Ill.

[21] Appl. No.: 924,360

[22] Filed: Jul. 31, 1992

Related U.S. Application Data

[63] Continuation of Ser. No. 711,577, May 31, 1991, abandoned, which is a continuation of Ser. No. 216,131, Jul. 7, 1988, abandoned.

[51] Int. Cl.$^5$ .................. G07G 1/12; G06F 15/00; G06F 13/00
[52] U.S. Cl. .................. 395/275; 235/380; 902/22; 364/405; 364/918.5; 364/926.91; 364/926.93; 364/927.97; 364/927.98; 364/927.99; 364/DIG.
[58] Field of Search ................. 395/275, 425; 902/22; 235/383, 2, 7 R, 380; 364/405; 370/85.1; 340/825

[56] References Cited

U.S. PATENT DOCUMENTS

| | | | |
|---|---|---|---|
| 3,760,373 | 9/1973 | Bartz | 364/900 |
| 4,037,210 | 7/1977 | Sharp | 364/900 |
| 4,156,917 | 5/1979 | Olander, Jr. et al. | 364/200 |
| 4,229,792 | 10/1980 | Jensen et al. | 364/200 |
| 4,245,311 | 1/1981 | Nakamura | 364/405 |
| 4,263,650 | 4/1981 | Bennett et al. | 364/200 |
| 4,264,954 | 4/1981 | Briggs et al. | 364/200 |
| 4,360,872 | 11/1982 | Suzuki et al. | 364/405 |
| 4,390,964 | 6/1983 | Horky et al. | 364/900 |
| 4,410,961 | 10/1983 | Dlugos et al. | 364/900 |
| 4,493,038 | 1/1985 | Bovio et al. | 364/405 |
| 4,502,119 | 2/1985 | Tsuzuki | 364/405 |
| 4,529,871 | 7/1985 | Davidson | 235/383 |
| 4,538,224 | 8/1985 | Peterson | 364/200 |
| 4,564,904 | 1/1986 | Kumagai | 364/405 |
| 4,589,069 | 5/1986 | Endo et al. | 364/405 |
| 4,673,802 | 6/1987 | Ohmae et al. | 902/22 |
| 4,678,896 | 7/1987 | Carlson et al. | 902/22 |
| 4,683,536 | 7/1987 | Yamamoto | 902/22 |
| 4,766,295 | 8/1988 | Davis et al. | 235/383 |
| 4,786,788 | 11/1988 | Noji | 235/383 |
| 4,787,028 | 11/1988 | Finfrock et al. | 364/200 |
| 4,812,968 | 3/1989 | Poole | 364/200 |
| 4,879,650 | 11/1989 | Kurimoto et al. | 364/405 |
| 4,912,309 | 3/1990 | Danielson et al. | 235/380 |
| 4,972,504 | 11/1990 | Daniel, Jr. et al. | 455/2 |
| 5,119,294 | 6/1992 | Tanaka | 364/405 |

OTHER PUBLICATIONS

Glen G. Langdon, Jr., *Computer Design* (1982) at p. 329.

*Primary Examiner*—Michael R. Fleming
*Assistant Examiner*—Gopal C. Ray
*Attorney, Agent, or Firm*—Wood, Phillips, Van Santen, Hoffman & Ertel

[57] ABSTRACT

A register system for facilitating point of sale transactions of any of a plurality of products, each of the products having a bar code encoded product identification associated therewith, is disclosed. The register system comprises a central computer for storing data representing a sales price for each of the products, a plurality of distributed point of sale registers coupled to the central computer, a bar code reader, operatively associated with each of the registers, for scanning the bar code encoded product identification from the products. Each register is responsive to the scanned product identification and communicates with the central computer for transferring to the register associated with the bar code reader the sales price for the selected one of the products. The register system includes a bidirectional card reader for reading data stored as a plurality of sequential multi-bit characters on a magnetic stripe on a card. The register system further includes a processor having a single I/O port and a circuit for permitting the processor to communicate with a plurality of serial I/O ports.

18 Claims, 13 Drawing Sheets

| P | $B_3$ | $B_2$ | $B_1$ | $B_0$ | CHARACTER |
|---|---|---|---|---|---|
| 1 | 0 | 0 | 0 | 0 | ZERO |
| 0 | 0 | 0 | 0 | 1 | ONE |
| 0 | 0 | 0 | 1 | 0 | TWO |
| 1 | 0 | 0 | 1 | 1 | THREE |
| 0 | 0 | 1 | 0 | 0 | FOUR |
| 1 | 0 | 1 | 0 | 1 | FIVE |
| 1 | 0 | 1 | 1 | 0 | SIX |
| 0 | 0 | 1 | 1 | 1 | SEVEN |
| 0 | 1 | 0 | 0 | 0 | EIGHT |
| 1 | 1 | 0 | 0 | 1 | NINE |
| 1 | 1 | 0 | 1 | 0 | NOT USED |
| 0 | 1 | 0 | 1 | 1 | START CHARACTER |
| 1 | 1 | 1 | 0 | 0 | NOT USED |
| 0 | 1 | 1 | 0 | 1 | SEPARATOR (1) |
| 0 | 1 | 1 | 1 | 0 | NOT USED |
| 1 | 1 | 1 | 1 | 1 | STOP CHARACTER |
ANSI STANDARD X4.16
FIG. 15
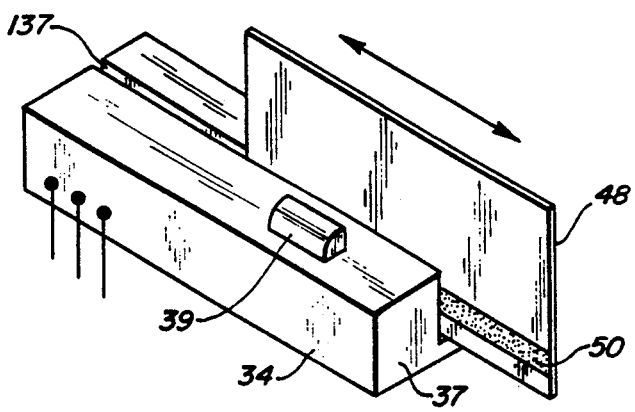
FIG. 16
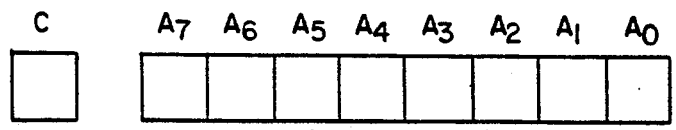
FIG. 17

POINT OF SALE REGISTER SYSTEM

This application is a continuation of application Ser. No. 711,577, filed May 31, 1991, now abandoned which is a continuation of Ser. No. 216,131, filed Jul. 7, 1988 now abandoned.

FIELD OF THE INVENTION

The invention relates to a point of sale register system utilizing a plurality of point of sale registers, also referred to as cash registers, and more particularly, to a point of sale register system having an improved capability to manipulate data.

DESCRIPTION OF THE BACKGROUND ART

Previously, many retail operations have utilized a plurality of point of sale registers, each coupled to a central computer. Each of the registers contain a processor and are coupled to one of a plurality of optical character readers, or OCR's. Each of the OCR's scan alphanumeric product identification information from products to be purchased and transfer this scanned information to its respective register.

The central computer stores information correlating the product identification information for each of the products to the product's specific sales price. The register communicates with the central computer to obtain the specific price of each item scanned. This eliminates a requirement to individually key into the register the price of each item purchased. However, while most products include a standard bar code encoded product identifier placed on the product by the manufacturer, alphanumeric product information must be added for each specific item by the particular retail operation.

Often the purchases are charged on a credit card. The central computer further contains information regarding an account status of each outstanding credit card account. If the credit card is so equipped, the OCR scans an alphanumeric account number representation from the credit card. In this manner, the information can be transferred to the central computer to determine the account status of that particular credit account.

If the central computer determines that no additional credit is to be allowed, and the purchaser still desires to make the purchase by credit card, a phone call is manually initiated to a human operator who has authority to override the central computer. The store clerk must first inform the operator of the particular credit account number and the amount of additional credit desired, as by utilizing the touch-tone pad of the telephone. However, it is generally recognized by those skilled in the art as an inherent problem that this form of data entry often results in errors, requiring time consuming reentry of the information by the store clerk.

Many credit cards are provided with a magnetic stripe onto which data such as its respective credit account number and expiration date, is stored. The data stored on the magnetic stripe of such credit cards is scanned by moving the magnetic stripe past a magnetic head of a magnetic stripe reader which reads the data. However, registers have been incapable of receiving and utilizing this data. Further, the card has been capable of being passed by the magnetic head in only one, predetermined direction, referred to as a forward scan, but such "unidirectional scanning" often makes it physically awkward to scan the credit card.

Another limiting feature of point of sale register systems is that standard microprocessors typically have a single input/output (or I/O) port. Thus, when it has been desirable for the microprocessor to communicate with a plurality of peripheral devices, complex circuitry has been required.

The invention disclosed herein is provided to overcome some or all of the above problems.

SUMMARY OF THE INVENTION

It is an object of applicants' invention to provide a point of sale register system.

It is a further object of applicants' invention to provide an interface circuit for a point of sale register which facilitates a transfer of data between the point of sale register and any of a plurality of peripheral devices coupled thereto.

In accordance with the invention, the peripheral devices can by way of example include a bar code reader, a magnetic stripe reader, a telephone, a printer or any other similar device.

It is still another object of applicants' invention to provide an interface circuit which can interpret data scanned by a reader from a magnetic stripe of a credit card regardless of whether such data was so scanned by the reader in a forward or a reverse direction.

It is yet another object of the invention to provide a circuit which will allow a microprocessor having a single serial I/O port to selectively communicate with any of a plurality of serial devices, such as the peripheral devices coupled to the interface circuit.

In the embodiment disclosed herein, the interface circuit is coupled to an NCR 2152 cash register, sold by the NCR Corporation of Dayton, Ohio. However, this particular point of sale register is for description only and should not be construed as a limitation of applicants' invention.

In the preferred embodiment, a register system for facilitating point of sale transactions of any of a plurality of products is provided, wherein each of the transacted products have a bar code encoded product identification associated therewith. The register system comprises a central processor, means associated with the central processor for storing data representing a sales price for each of the products and a plurality of distributed point of sale registers coupled to the central computer. The register system further comprises a plurality of bar code readers, wherein one of the bar code readers is associated with each of the registers, each of the bar code readers for scanning the bar code encoded product identification from the transacted product and means responsive to the scanned bar code encoded product identification and the stored product information for transferring to the register associated with the bar code reader the product sales price for the product scanned.

It is yet another object of the present invention to provide a bidirectional card reader for reading data stored on a magnetic stripe on a card as a sequence of multi-bit characters of the same bit length. The bidirectional card reader comprises a scanning head, means for sequentially reading the data bit-by-bit as the card is passed relative to the scanning head, means for sequentially storing the bits as the bits are scanned, means for determining whether the card was passed by the scanning head in a forward or a reverse direction, means for locating the last data bit received if the determining means determines that the card was passed in the reverse direction and means responsive to the locating means for correctly grouping the stored bits as the multi-bit characters stored on the magnetic stripe.

It is still yet another object of the present invention to provide a circuit for permitting a processor having a single serial I/O port including a transmit channel and a receive channel to communicate with a plurality of peripheral devices each having serial I/O ports including a transmit channel and a receive channel. The circuit comprises first means for determining which of the peripheral devices has data to be transferred to the processor, second means for determining to which of the peripheral devices the processor has data to be transferred, third means responsive to the first and second determining means for determining which of the data is to be transferred and switching means comprising first means for selectively coupling the transmit channel of the processor to the receive channel of each of the peripheral devices and second means for selectively coupling the receive channel of the processor to the transmit channel of each of the peripheral devices, the switching means being responsive to the third determining means for controlling the first and second determining means to permit transfer of the data.

Other features and embodiments of the invention will be apparent from the following specification taken in conjunction with the accompanying drawings.

BRIEF DESCRIPTION OF THE DRAWINGS

FIG. 15 is a chart illustrating an ANSI standard X4.16 digital representation of characters stored on the magnetic stripe of the credit card of FIG. 3;

FIG. 16 is an isometric view of a credit card reader; and

FIG. 17 is a graphic illustration of a microprocessor accumulator.

DESCRIPTION OF THE PREFERRED EMBODIMENT

Figure 1:
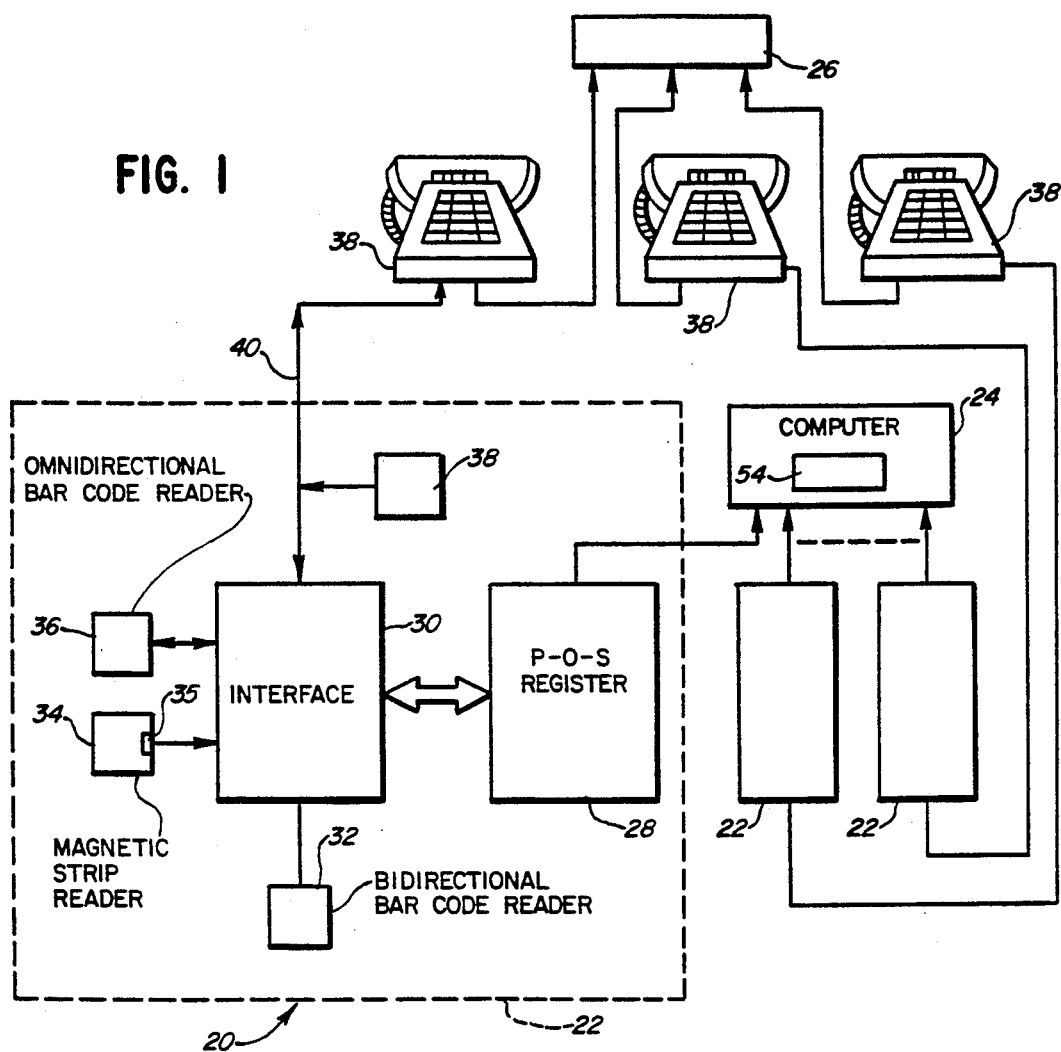
FIG. 1 is a block diagram of a point of sale register system according to the present invention.

According to the present invention, a point of sale register system 20 which includes a plurality of point of sale terminals 22, a central computer 24 and a voice communication device 26 is illustrated in FIG. 1. Each of the point of sale terminals 22 is coupled to peripheral devices including a point of sale register 28, an interface board 30, a bidirectional bar code reader 32, a magnetic stripe reader 34, an omni-directional bar code reader 36 and a telephone 38. By way of example, the register 28 can be an NCR 2152 terminal, manufactured by NCR Corporation of Dayton, Ohio, or any other processor based register.

As for the other peripheral devices, the omnidirectional bar code reader 36 can be of a type such as, for example, the one manufactured by IBM Corporation. The bidirectional bar code reader 32 can be of a type such as, for example, the HP 6300 series contact wand as distributed by Hewlett Packard, 350 West Trimble Road, San Jose, Calif. 95131, the Laserscan 7000II hand held scanner, distributed by Symbol Technologies, Inc., 1101 Lakeland Avenue, Bohemia, N.Y. 11716, or other such devices well known in the art. Further, the magnetic stripe reader 34 can be of a type such as, for example, the MT-211 card reader distributed by MAGTEK of 20725 South Annalee Avenue, Carson, Calif. 90746 and includes a magnetic stripe reader head 37.

As will be understood by referring to FIG. 1, the register 28 couples the point of sale terminal 22 to the central computer 24. The bidirectional bar code reader 32, the magnetic stripe reader 34 and the omni-directional bar code reader 36 are then coupled to the register 28 by the interface board 30. Finally, the telephone 38 and the interface board 30 are mutually coupled in parallel to the voice communication device 26 by a telephone line 40.

Figure 2:
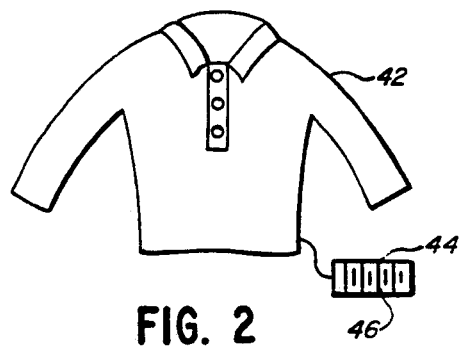
FIG. 2 illustrates a product to be sold including a bar code.

While not limited as to application, the point of sale register system 20 is designed for utilization in large retail operations. Typically, such retail operations have many departments, wherein at least one point of sale terminal 22 is located in each of the departments for selling a product 42, as for example a shirt, as illustrated in FIG. 2. As shown, the product 42 includes a tag 44 having a preprinted bar code representation 46 thereon which identifies the product 42.

By way of example, the bar code representation 46 may be in any bar code format now known or subsequently developed, including but not limited to Code 39 3 of 9), Code 128, and UPC Code.

Figure 3:
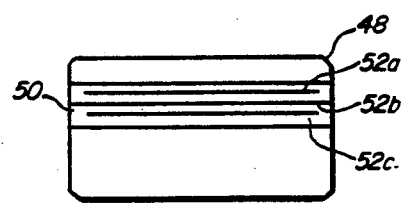
FIG. 3 illustrates a credit card including a magnetic stripe.

As illustrated in FIG. 3, a credit card 48 typically includes a magnetic stripe 50 onto which data is stored. Specifically, the credit card 48 is associated with a specific credit account having a specific credit account number and the magnetic stripe 50 includes first, second and third data tracks 52a, 52b and 52c, onto which three tracks of data are stored, directed from left to right with respect to FIG. 3. As described in greater detail below, the credit account number is encoded on the second data track 52b as credit account number data.

Referring again to FIG. 1, the central computer 24 includes a central computer memory 54 which stores price information for every product sold by the retail operation. Thus, for example, when a customer desires to purchase the product 42 (FIG. 2), the bar code representation 46 on the tag 44 is scanned by either the bidirectional bar code reader 32 or the omni-directional bar code reader 36. After the tag 44 has been scanned, the information is received by the interface board 30 and transferred to the register 28.

The register 28 then accesses the central computer memory 54 of the central computer 24 to determine the sales price of the product 42 selected by the customer for purchase. This is done for each product to be purchased. The register 28 then sums the individual sales prices of each of the products to be purchased and calculates a total sales price, upon which applicable sales tax or other charges are added.

If the purchase is to be by cash, the customer simply pays cash. However, the purchase may be charged on the credit card 48. The credit card 48 may be either one issued by the particular retail operation, or a bank or other card.

If the purchase is to be charged on the credit card 48, the magnetic stripe 50 is passed by the magnetic stripe reader head 37 of the magnetic stripe reader 34. The magnetic stripe reader 34 reads the credit account number data from the second data track 52b. As is described in greater detail below, the credit card 48 can be passed by the head 37 of the magnetic stripe reader 34 in either direction The interface board 30 receives the credit account number data read by the magnetic stripe reader 34 and transfers this data to the register 28. The central computer memory 54 further includes information indicating an account status of each of the credit accounts (i.e., whether additional credit purchases are to be allowed on any particular credit account). The register 28 accesses the central computer memory 54 to determine the account status of the credit account for the credit card 48 just scanned.

If the central computer memory 54 indicates that additional credit is to be allowed, the register 28 proceeds to charge the particular credit account with the total price of the purchase. However, if the central computer memory 54 determines that additional credit is not to be allowed, the register 28 displays this information to the sales clerk. If the customer still wants to charge the purchase to their credit account, the interface board 30 automatically dials a predetermined telephone number to connect the telephone 38 with the voice communication device 26 of a central credit department.

At that point, the customer can explain to the credit department why additional credit should be allowed, after which the credit department may chose or decline to authorize additional credit. To expedite such authorization, the interface board 30 can further transmit information to the credit department identifying the particular credit account in question and the amount of additional credit desired.

Figure 4:
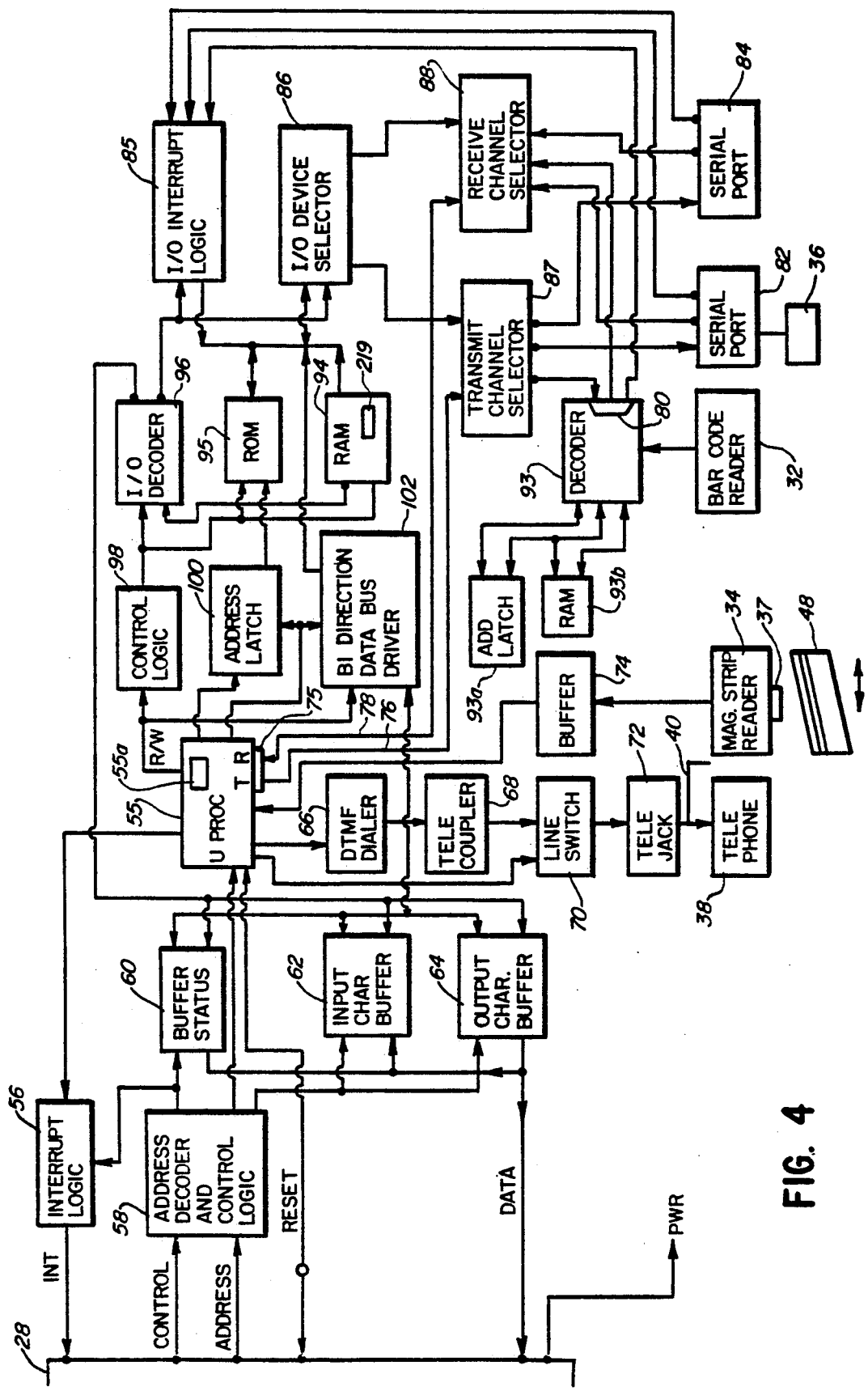
FIG. 4 is a block diagram of an interface board according to the present invention.
Figure 5:
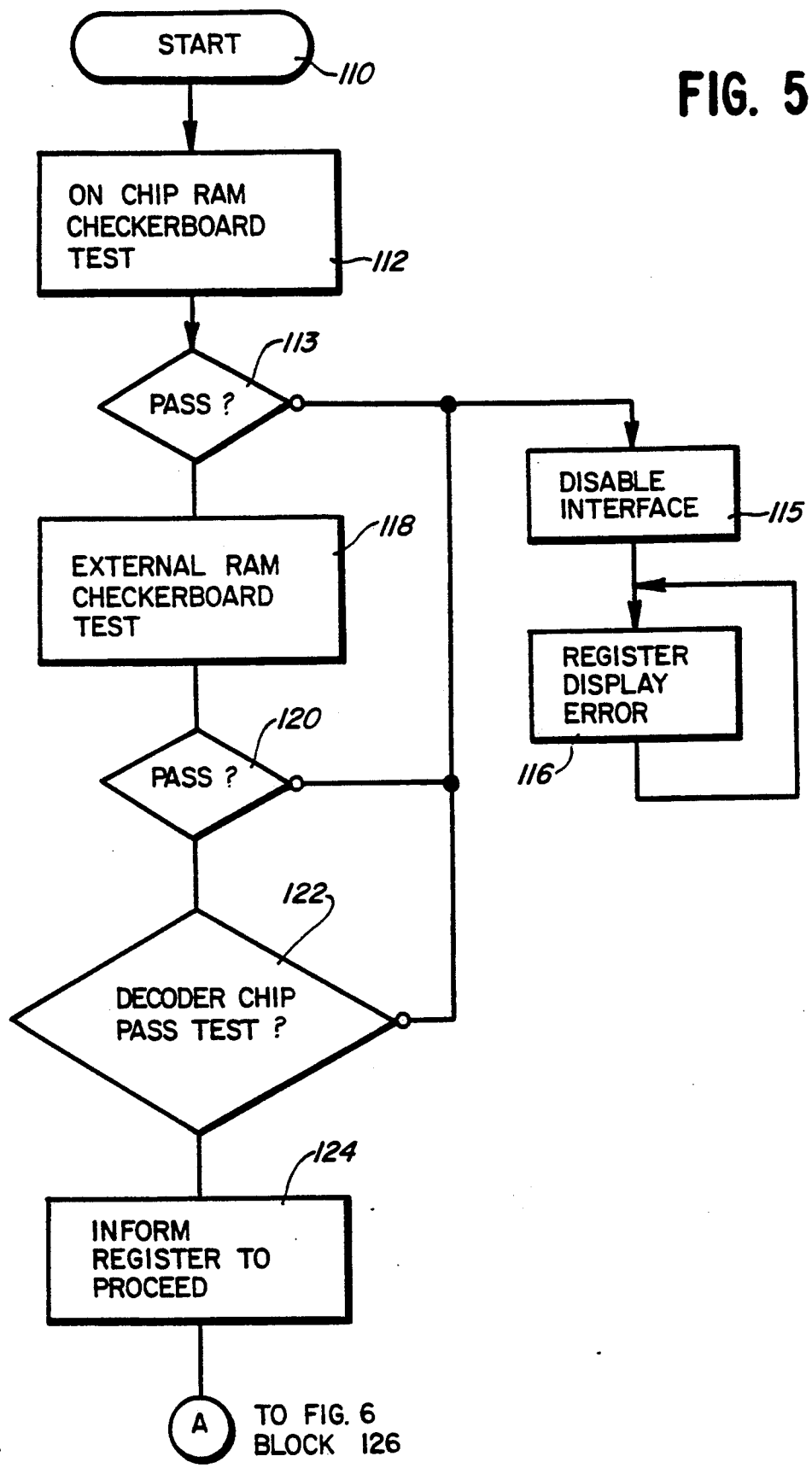
FIGS. 5-13 are flow charts illustrating operation of the interface board according to the present invention.

The interface board 30 is illustrated in block diagram in FIG. 4 and includes a processor 55, including on-board random access memory (RAM) 55a, which can by way of example be an Intel 8031 microprocessor. The processor 55 performs primary control over the interface board 30 and controls data flow between the register 28 and the peripheral devices.

The interface board 30 further includes an interrupt logic device 56, an address decoder and control logic device 58, a buffer status device 60, an input character buffer device 62 and an output character buffer device 64 to facilitate transfer of data between the processor 55 and the register 28, as described in greater detail below.

To connect to, and automatically dial, the telephone 38, the interface board 30 includes a dialer device 66, a telephone coupler device 68, a line switch device 70 and a telephone jack 72. The dialer device 66 generates a touch-tone signal under control of the processor 55, the telephone coupler device 68 provides isolation between the interface board 30 and the telephone line 40 and the line switch 70 makes and breaks the connection between the telephone coupler device 68 and the telephone line 40. As for the telephone jack 72, it is preferably a standard modular telephone connector which allows the telephone 38 to removably connect with the interface board 30.

Still referring to the block diagram as illustrated in FIG. 4, the interface board 30 further includes a buffer device 74 which couples the magnetic stripe reader 34 to the processor 55 in a manner providing signal buffering. More specifically, the buffer device 74 provides signal buffering between the magnetic stripe reader 34 and the processor 55 to protect the processor 55 against potentially damaging electrostatic discharge generated by the magnetic stripe reader 34.

The processor 55 has a single serial channel 75 to which transmit and receive data lines 76, 78, respectively, are coupled. The interface board 30, however, has first, second and third serial ports 80, 82, 84 respectively. To permit the serial channel 75 of the processor 55 to selectively communicate with devices coupled to any one of the three serial ports 80, 82, 84, an I/O interrupt logic device 85, an I/O device selector 86, a transmit channel selector device 87 and a receive channel selector device 88 are provided.

Each of the serial ports 80, 82, 84 are coupled both to the transmit channel selector device 87 and the receive channel selector device 88, and to the I/O interrupt logic device 85. When one of the serial ports 80, 82, 84 has data for the interface board 30, the particular serial port 80, 82 or 84 addresses the I/O interrupt logic device 85 to inform the interface board 30 that such serial port 80, 82 or 84 has data therefor. The I/O interrupt logic device 85 commands the I/O device selector 86 under control of the processor 55 to couple the receive channel selector device 88 to the one of the serial ports 80, 82 or 84 having such data and the receive channel selector 88 passes the received data to the processor 55 via the receive serial data line 78. Similarly when the processor 55 has data to output to one of the serial ports 80, 82 or 84, the processor 55 commands the I/O device selector 86 to couple the transmit channel selector device 87 to the desired one of the serial ports 80, 82 or 84. Thus, the transmit channel selector device 87 and the receive channel selector device 88 each operate effectively as three position switches to selectively couple any one of the serial ports 80, 82 or 84 with the processor 55 upon command from the I/O device selector 88. This transfer of data is described in greater detail below with respect to the flow charts of FIGS. 5-13.

In the embodiment described herein, the bar code reader 32 is coupled to a decoder 93 and to the serial channel 75 of the processor via the transmit channel selector device 87 and the receive channel selector device 88. Specifically the decoder 93 is the HBCR 2000 Multi-Purpose Bar Code Decoder IC manufactured by Hewlett Packard Bar Code Products, 350 West Trimble Road, San Jose, Calif. 95131. As is well known in the art, an address latch 93a and random access memory 93b are each coupled to the decoder 93. A more detailed description of the HBCR 2000 Multi-Purpose Bar Code Decoder IC is found in Hewlett Packard Manual Part No. 5954-2165, dated Jan. 1986 and distributed by Hewlett Packard Bar Code Products.

The bar code representations 46 (FIG. 2) can, for example, be encoded in any of five presently known standard bar code types. The decoder 93 will decode any of the five different bar code types, transmitting the resultingly decoded data to the processor 55 via the receive channel selector 88 and the receive serial data line 78. However, the specific embodiment described herein for purposes of illustrating the invention utilizes only Code 3 of 9, UPC Code and Code 128.

The interface board 30 further includes second random access memory (RAM) 94, read only memory (ROM) 95, an I/O decoder device 96 and a control logic device 98. The ROM 95 stores an operating program for the processor 55, and the second RAM 94 provides temporary storage for data passing between the peripheral devices and the register 28 The I/O decoder device 96 selects the particular peripheral device to be addressed by the processor 55, and the control logic device 98 provides handshaking and control signals necessary for the processor 55 to access various logic blocks. Specifically, the control logic device 98 enables the processor 55 to view one peripheral device at a time and the interrupt logic device 56 informs the register 28 when the interface board 30 has data to transmit to the register 28.

The address decoder and control logic device 58 provides necessary handshaking signals required for data interchange between the interface board 30 and the register 28. The input character buffer device 62 stores one character of data at a time as data is transferred from the register 28 to the interface board 30. Similarly, the output character buffer device 64 stores data one character at a time as data is transferred from the interface board 30 to the register 28. The buffer status device 60 allows both the register 28 and the interface board 30 to monitor the status of data in either the input character buffer device 62 or the output character buffer device 64. Specifically, the buffer status device 60 tells the interface board 30 if a character is currently in the input character buffer device 62 and tells the register 28 if a character is currently in the output character buffer device 64.

The interface board further includes an address latch device 100 and a bidirectional data-bus driver device 102. Data is transferred as two segments, the first segment containing its intended address and the second segment containing its message. The address latch device 100 stores the address segment enabling the intended device to receive or transmit the message segment. The bidirectional data-bus driver 102 controls the direction of data flow to the processor 55.

FIGS. 5-13 combine to form a flow chart to illustrate operation of the interface board 30.

Operation begins in first block 110 (FIG. 5) upon application of power to the interface board 30. Following power up, control passes to a block 112 which performs a checkerboard test of the on-board RAM 55a resident on the processor 55. The checkerboard test is performed by first writing zeros and ones alternately in memory locations of the on-board RAM 55a and then reading these locations to confirm that the zeros and ones are correctly in their respective locations. The checkerboard test continues by subsequently alternately writing zeros and ones, but reversing their locations. These memory locations are again read to confirm their correct values. Upon completion of the checkerboard test, control passes to a block 113 which determines whether the checkerboard test was passed.

If the test was not passed, control passes first to a block 115 which disables the interface board 30 and subsequently to a block 116 which commands the register 28 to display an error message. The register 28 continues to display the error message until manually cleared. However, if the checkerboard test is passed, control passes to a block 118 which performs a similar checkerboard test on the second RAM 94.

Upon completion of the checkerboard test on the second RAM 94, control passes to a block 120 which determines whether this test was passed. If the block 120 determines that the second RAM 94 checkerboard test was not passed, control passes to the block 115. If the block 120 determines that the second RAM 94 checkerboard test was passed, control passes to a block 122 which determines whether the decoder 93 is operational. The HBCR-2000 decoder of this preferred embodiment performs its own diagnostic routine, so the block 122 simply addresses the decoder 93 to determine whether the decoder 93 passed its diagnostic routine. If the decoder 93 does not pass its diagnostic routine, control passes to the block 115. If the decoder 93 does pass its diagnostic routine, control passes to a block 124 which commands the register 28 to proceed after which control passes to a block 126, FIG. 6.

The block 126 initializes all operation parameters to their starting conditions, and control then passes to a block 128. The block 128 addresses the buffer status device 60 to determine whether there is data to be transferred between the register 28 and the interface board 30. If there is such data, control passes to a block 130 which determines whether this data is to be transferred from the register 28 to the interface board 30, or vice versa.

Figure 7:
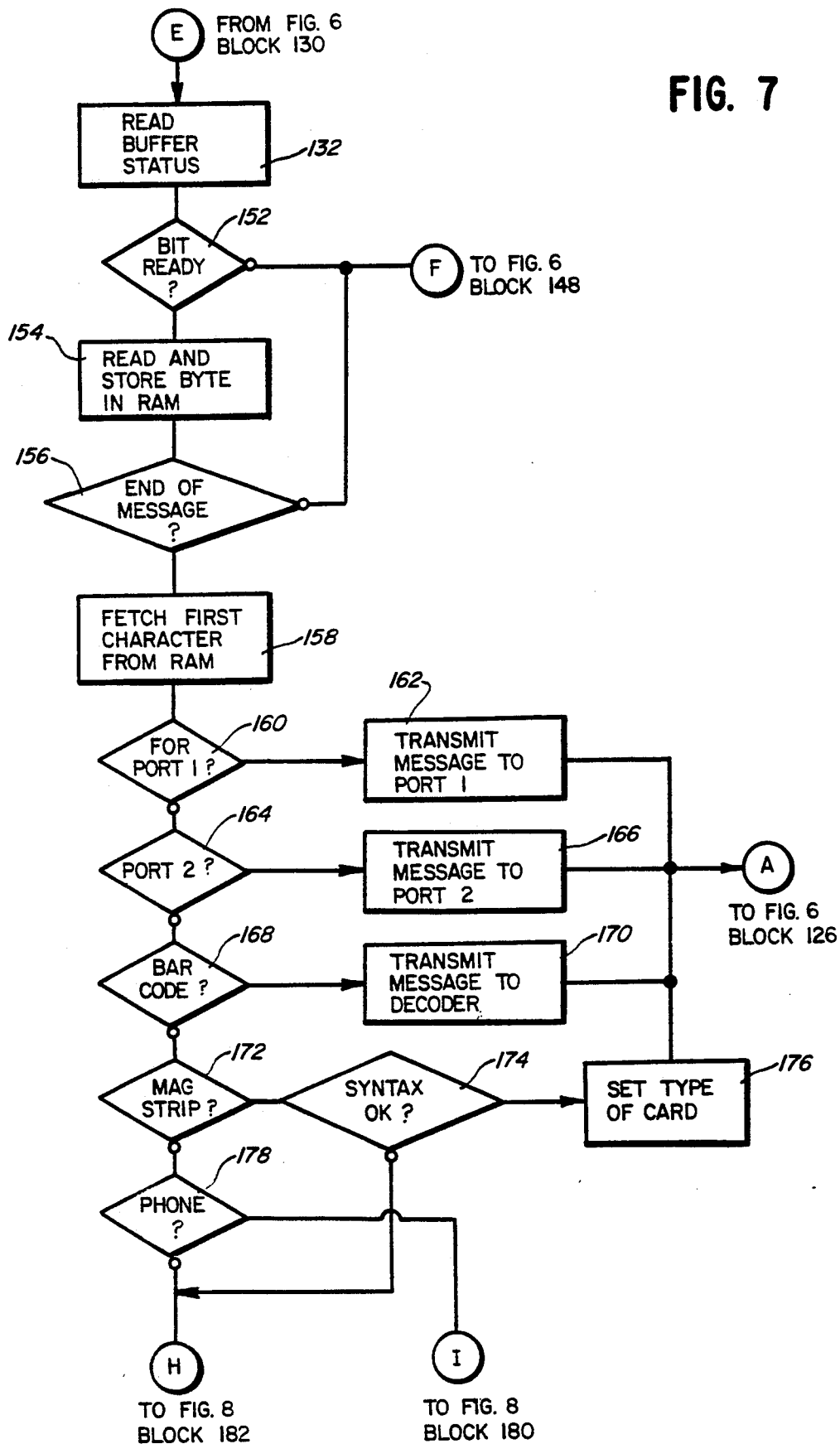

If the data is to be transferred from the register 28 to the interface board 30, control passes to a block 132, FIG. 7. If the data is to go from the interface board 30 to the register 28, control passes to a block 134, FIG. 13.

Figure 6:
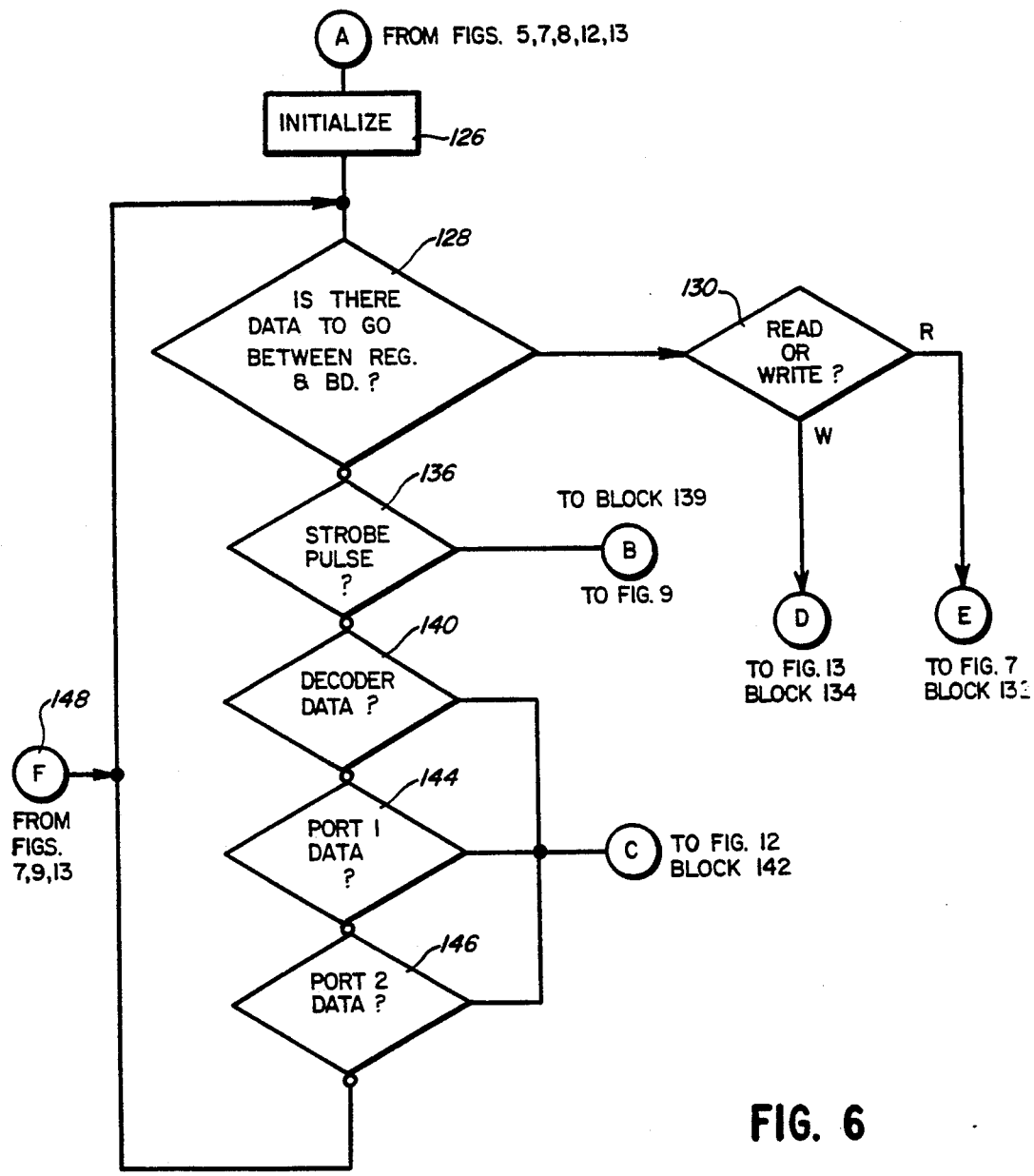

Referring again to the block 128, FIG. 6, if there is no data to be transferred between the register 28 and the interface board 30, control passes to a block 136 which determines whether a strobe signal is being received from the magnetic stripe reader 34 (see FIG. 4), which is more specifically illustrated in FIG. 16. The magnetic stripe reader 34 includes a longitudinal groove 137 adjacent the magnetic stripe reader head 37. The credit card 48 is drawn through the groove 137 with the magnetic stripe 50 adjacent to and directed toward the magnetic stripe reader head 37. The credit card 48 can be drawn past the magnetic stripe reader head 37 in either a forward direction or in a reverse direction. As the magnetic stripe 50 is drawn past the magnetic stripe reader head 37, data stored on the magnetic stripe 50 is read by the magnetic stripe reader head 37.

Figure 14:
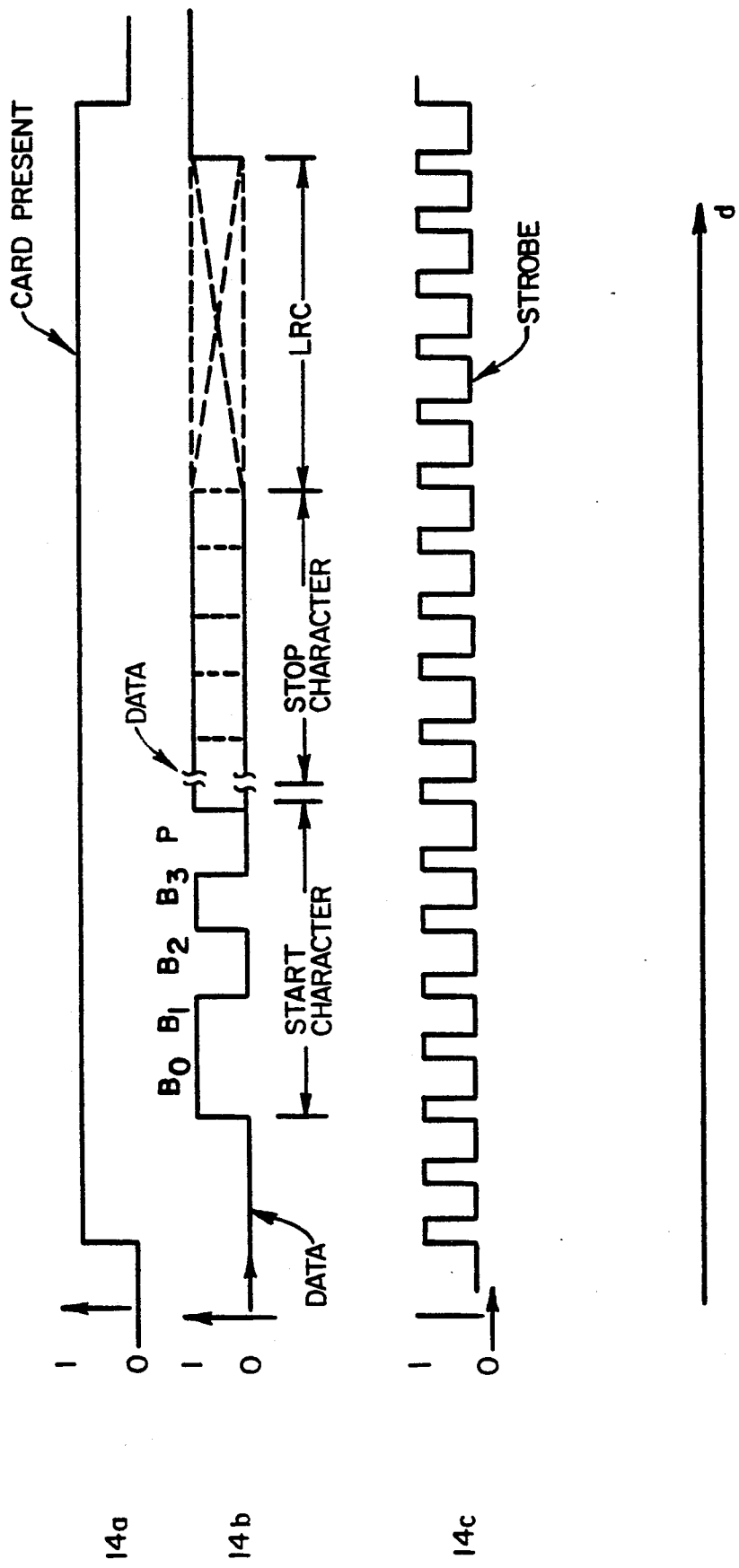
FIG. 14 is a graphic illustration of data stored on the magnetic stripe of the credit card of FIG. 3.

The magnetic stripe reader 34 generates three signals, as illustrated in FIG. 14 as curves 14a, b and c. The first signal is a card present signal (14a), which is zero except when the credit card 48 is placed within the groove 137. The second signal is a strobe signal (14c), which is a square wave stored on the magnetic stripe 50 and which has a frequency proportional to the speed at which the credit card 48 is drawn past the magnetic stripe reader head 37. The third signal is a data signal (14b) representing the actual data stored on the second track 52b of the magnetic stripe 50.

Figure 9:
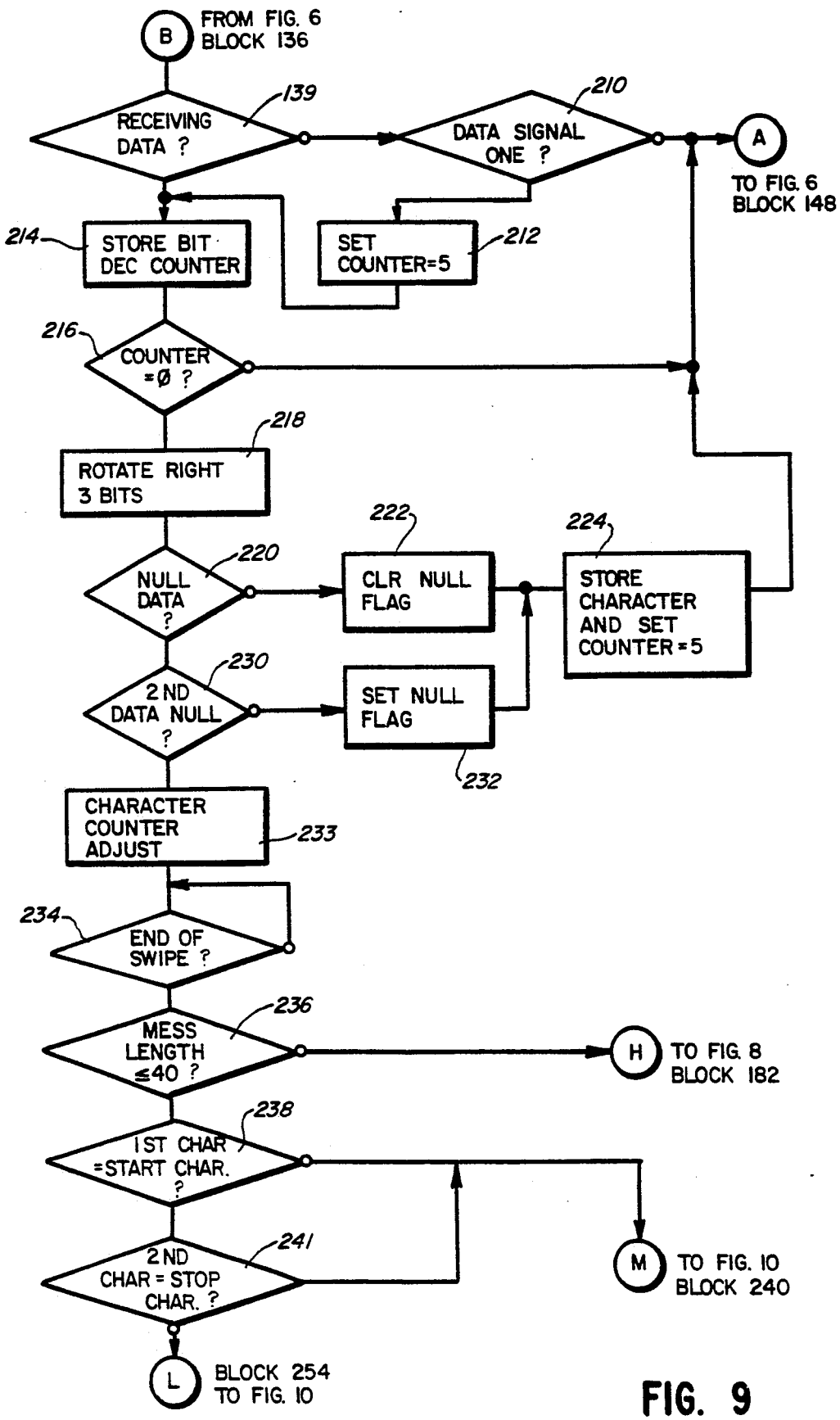
Figure 10:
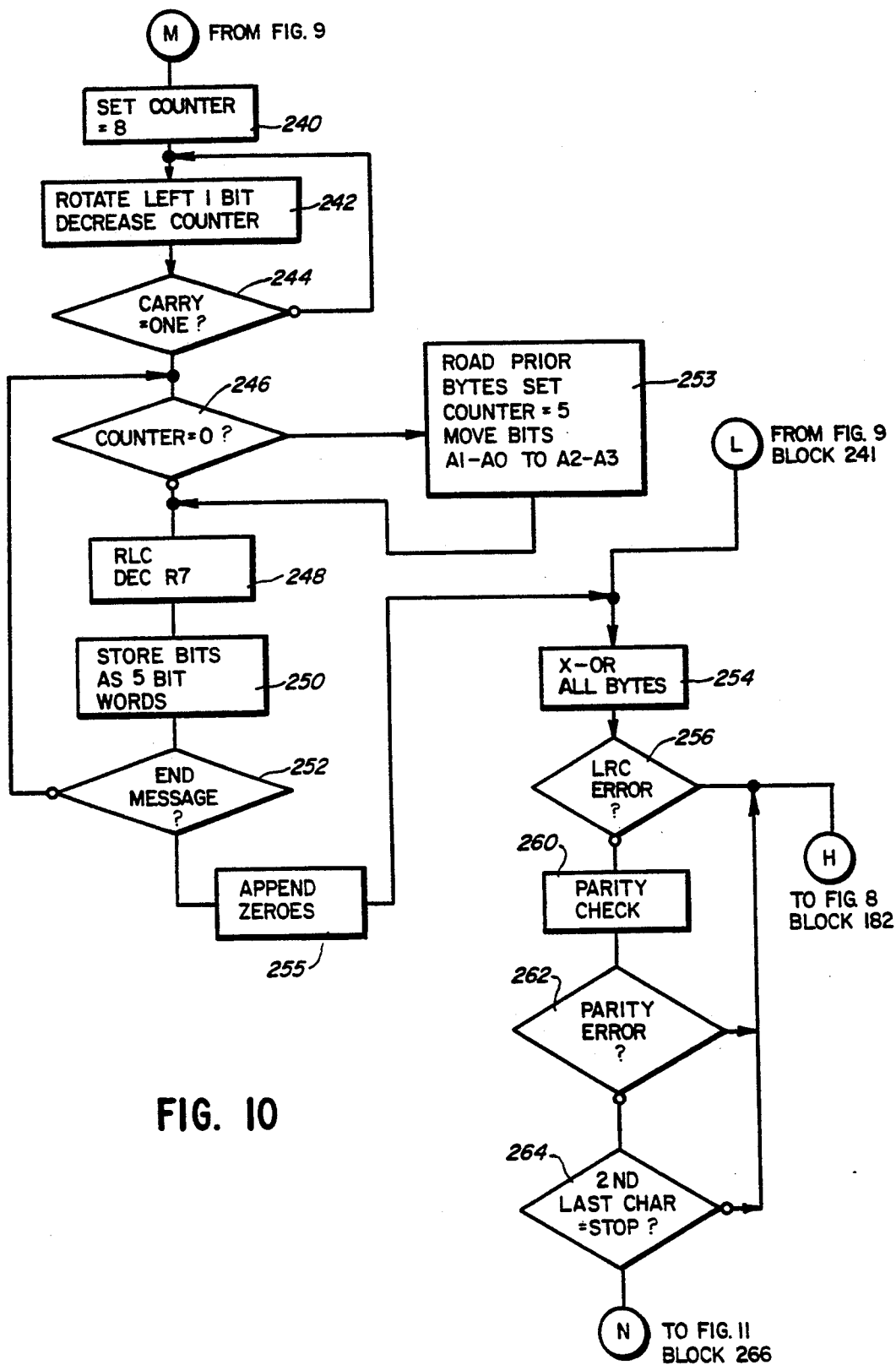

Referring again to FIG. 6, if the block 136 determines that the strobe signal is present, indicating the credit card 48 is in the groove 137 of the magnetic stripe reader 34, control passes to a block 139, FIG. 9. If the block 136 determines that the strobe signal is not present, control passes to a block 140 which polls the I/O interrupt logic device 85 to determine whether the decoder 93 has data. If the block 140 determines that the decoder 93 does have data, control passes to a block 142 of FIG. 12. If the block 140 determines that the decoder 93 does not have data, control passes to a block 144 which polls the I/O interrupt logic device 86 to determine whether the second serial port 82 has data.

Figure 12:
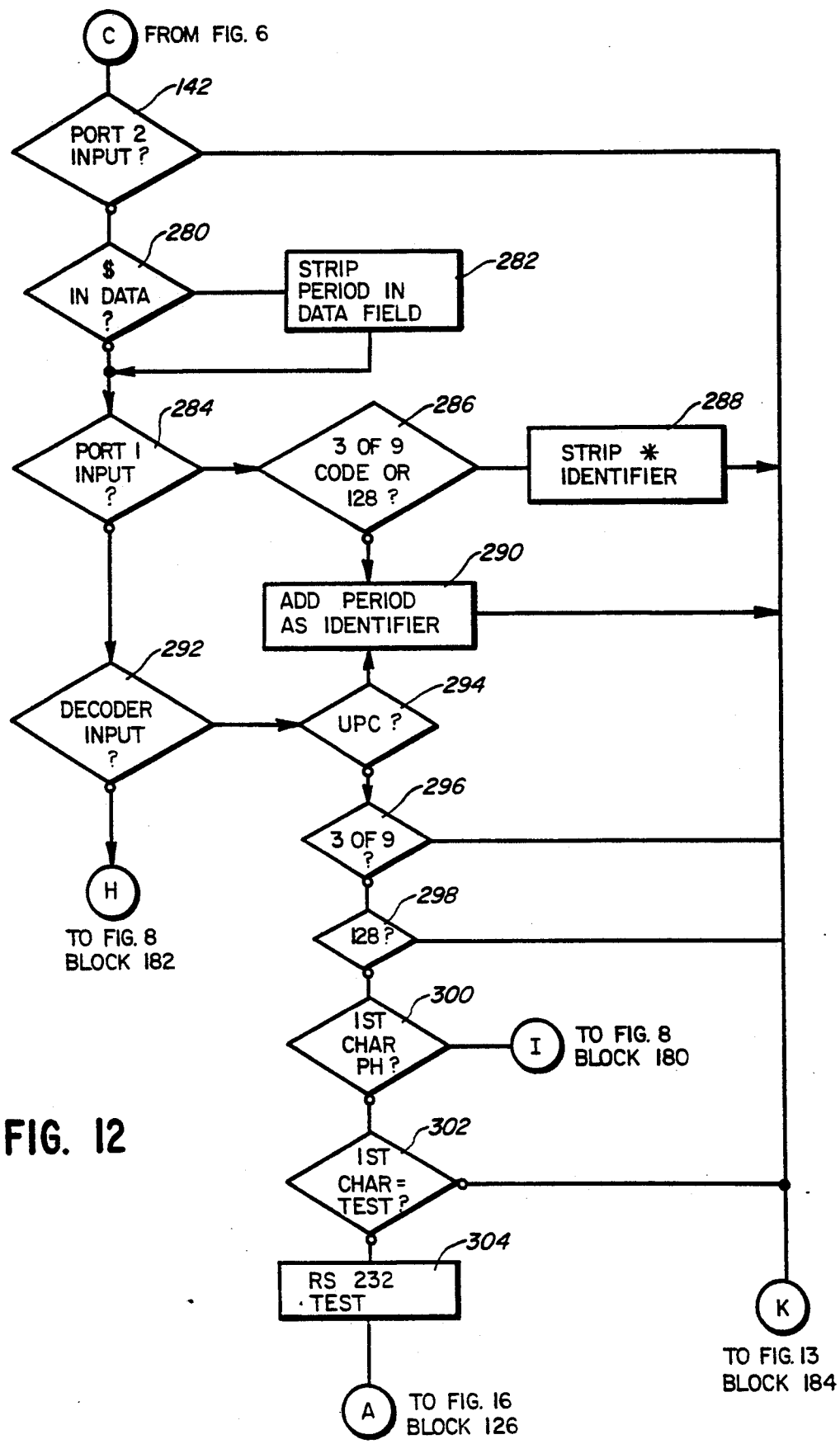

If the block 144 determines that the second serial port 82 has data, control passes to the block 142, FIG. 12. If the block 144 determines that the second serial port 82 does not have data, control passes to a block 146 which polls the I/O interrupt logic device 86 to determine whether the third serial port 84 has data. If the third serial port 84 has data, control passes to the block 142, FIG. 12. If the third serial port 84 does not have data, control returns to the block 128.

Thus, the control loop comprising the blocks 128, 136, 140, 144 and 146 causes the processor 55 to sequentially determine whether data is to be transferred between the register 28 and the interface board 30, whether the credit card 48 is being scanned, whether the bar code reader is being utilized, whether the omnidirectional bar code reader 36 is being utilized and finally whether some data is to be received via the third serial port 84.

As indicated above, if the block 130 determines that there is data to be transferred from the register 28 to the interface board 30, control passes to the block 132, FIG. 7. The data to be transferred from the register 28 to the interface board 30 is actually for one of the peripheral devices. The data forms a message comprising a plurality of sequential characters, the first character indicating the particular peripheral device intended followed by text characters and terminating with an "end of message" character.

The block 132 reads the buffer status device 60, and control passes to a block 152. The input character buffer device 62 receives characters, one at a time, from the register 28, and the buffer status device 60 monitors whether the input character buffer device 62 has received a character. The block 152 determines whether a character has been received by the input character buffer device 62 and, if not, control returns to the block 148, FIG. 6. However, control passes to a block 154 in the event that the block 152 determines that a character has been received by the input character buffer device 62, and the block 154 reads the character stored in the input character buffer 62 and stores the character in the second RAM 94. Control then passes to a block 156.

When this occurs, the block 156 looks at the character just read by the block 154 to determine whether the character was the "end of message" character. If the block 156 determines that the character was not the "end of message" character, control passes to the block 148, FIG. 6.

If the block 156 determines that the character was the "end of message" character, control passes to a block 158. The block 158 retrieves the first character of the message stored in the second RAM 94 by the block 154. The first character indicates the intended peripheral device for the message, and control then passes to a block 160. The block 160 determines whether the message is for the omnidirectional bar code reader 36 (via the second serial port 82). If so, control passes to a block 162 which transmits the message to the second serial port 82, and control returns to the block 126 of FIG. 6.

If the block 160 determines that the message is not for the second serial port 82, control passes to a block 164, which determines whether the message is for a peripheral connected to the third serial port 84. If so, control passes to a block 166 which causes the message to be transferred to the peripheral via the third port 84, and control then returns to the block 126, FIG. 6.

If the block 164 determines that the message is not for the third serial port 84, control passes to a block 168 which determines whether the message is for the bar code reader 32 via the first serial port 80. If so, control passes to a block 170 which transmits the message via the first serial port 80 to the bar code reader 32, and control subsequently returns to the block 126 (FIG. 6).

If the block 168 determines that the message is not for the bar code reader 32, control passes to a block 172 which determines whether the message is for setting the edit parameters of the magnetic stripe reader 34. If so, control passes to a block 174 which checks for syntax of the message. The register system is provided to accept credit cards issued from only certain predetermined institutions. Thus, the block 176 presets the type of allowable credit cards 48 to be accepted at the register 28.

If the message is not for editing the data from the magnetic stripe reader 34, control passes to a block 178 which determines whether the message is for the dialer device 66. If so, control passes to a block 180, FIG. 8. If the message is determined not to be for the dialer device 66, and thus not for any of the peripheral devices, control passes to a block 182, FIG. 8.

Figure 8:
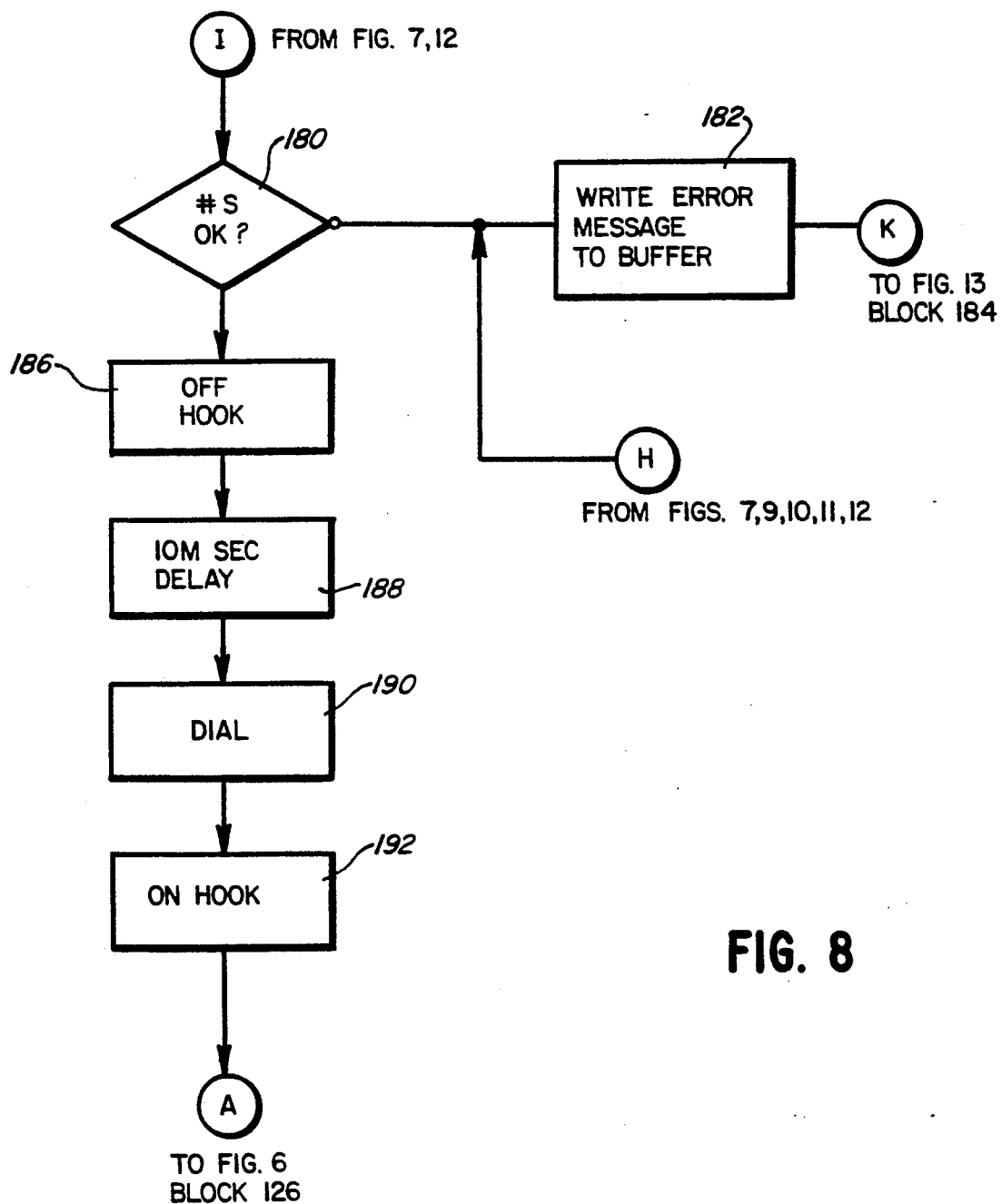

As indicated above, if the block 178 determines that the message received from the register 28 is for the dialer device 66, control passes to the block 180, FIG. 8. If the message is for the dialer device 66, the characters following the first, identifying character of the message, should represent legitimate digits to be dialed by the dialer device 66 (i.e., the numbers 0-9 the "*" key and the "#" key), and the block 180 will view these characters to determine whether they in fact are legitimate digits to be dialed. If they are not, control passes to the block 182 which commands an error message to be written to the output character buffer 64, and control passes to a block 184, FIG. 13.

If the block 180 determines that the characters do in fact represent legitimate digits to be dialed, control passes to a block 186. This activates the line switch 70 placing the telephone line 40 (FIG. 2) in an off-hook condition. Control then passes to a block 188 which causes a ten millisecond delay. This allows stabilization of the telephone line 40, at which time control passes to a block 190. The block 190 causes the dialer device 66 to sequentially dial the telephone number and, upon completion of the dialing, control passes to a block 192.

The block 192 causes the line switch 70 to go in an on-hook condition, disconnecting the dialer device 66 from the telephone line 40. It is to be understood that prior to the automatic dialing, the sales clerk would have manually lifted the receiver of the telephone 38. Thus, the dialer device 66 simply dials a predetermined number for the operator. However, when the line switch 70 disconnects the dialer device 66 from the telephone line 40, the telephone 38 remains connected because its receiver is still off-hook.

After the block 192 has caused the line switch 70 to disconnect the dialer device 66 from the telephone line 40, control passes to the block 126, FIG. 6.

Returning to FIG. 6, as discussed previously, if the block 136 determines that a strobe pulse is not present, control passes to the block 140. However, if the block 136 determines the presence of a strobe pulse, control passes to the block 139, FIG. 9.

As discussed above, the credit account number of the credit card 48 is stored on the second data track 52b of the credit card 48. The credit account number comprises a plurality of characters, each character sequentially stored on the second track 52b as a five bit character. FIG. 15 illustrates the American National Standards Institute (ANSI) standard X4.16 coding. Specifically, four bits B3, B2, B1, B0 are text, and the fifth bit is an odd parity bit P. The five bit character is actually stored on the second track 52b beginning with B0 and ending with the parity bit P. This is so the bits B0-B3 are received first and a parity bit is computed to then be compared to the received parity bit, as is well known in the art.

FIG. 1 illustrates the three output signals generated by the magnetic stripe reader 34.

As discussed above, the credit card 48 can be drawn through the groove 137 in either direction (i.e., a forward scan or a reverse scan). However, the data is encoded on the magnetic stripe 50 in only the forward scan direction. Thus, the immediately following discussion is with respect to a forward scan, and it will be discussed later how to effect a reverse scan.

Initially each of the output signals are zero. When the credit card 48 is inserted in the groove 137, the card present signal (14a) changes states from zero to one. The card present signal remains high until the credit card 48 is removed from the groove 137.

As the credit card 48 is drawn through the groove 137, the magnetic stripe reader 34 reads a square wave comprising alternating zeros and ones from the magnetic stripe 50 and generates a strobe signal (FIG. 14c). The frequency of the strobe signal is dependent upon the speed at which the credit card 48 is drawn through the groove 137. The strobe signal provides timing for decoding the data signal, discussed below. The data is not stored on the second data track 52b along the entire length of the credit card 48, but rather is centered. Thus the data signal does not begin concurrent with the strobe signal, but rather after a certain distance along the magnetic stripe.

The data is stored on the second track 52b in the order of first a start character, then at least one text character. Then there is a stop character followed by a longitudinal redundancy check, or LRC, character. Referring to FIG. 15, from B0-P, the start character comprises the bit pattern 11010 and the stop character comprises 11111.

Referring again to FIG. 14, and viewing the data signal 14b from left to right, the data signal remains low until bit B0 of the start character is received. As is discussed in greater detail below, this transition from 0 to 1 of the data signal 14b indicates the beginning of the data signal. Following the textual data is the stop character which, as indicated above, comprises the characters 11111 and following the stop character is the longitudinal redundancy check character.

The longitudinal redundancy check character is also formed of the bits B0, B1, B2, B3 and P. Bit B0 of the longitudinal redundancy character is an even parity of each of the preceding B0 bits. Similarly, the longitudinal redundancy character bits B1, B2, and B3 are even parities of each of the preceding B1, B2, B3 bits, respectively. The parity bit P of the longitudinal redundancy character comprises an odd parity of the bits B0, B1, B2, B3 of the bits B0-B3 of the LRC character itself.

Following the LRC character, the data signal is zero. As can be seen, when the credit card 48 is drawn through the groove 137 in the forward direction, it is simple to determine when the data signal begins. This follows because the data signal changes state from zero to one when the bit B0 of the start character is first scanned.

However, when the credit card 48 is drawn through the groove 137 in the reverse direction, the parity bit P of the LRC character is the first bit to be scanned. But the parity bit can, as well can bits B3, B2 and B1, potentially be equal to zero. Note: they cannot all equal zero because the parity bit of the longitudinal redundancy character is odd. Thus, if bits B0-B3 are all zero, the parity bit would be one. As is discussed in greater detail below, the interface board 30 can decode the data signal regardless of the direction that the credit card 48 is drawn past the magnetic stripe reader head 37.

As indicated previously with respect to FIG. 6, When the block 136 determines the presence of the strobe signal, indicating that the credit card 48 is being drawn through the groove 137 of the magnetic stripe reader 34, control passes to the block 139, FIG. 9.

Referring now to FIG. 9, the block 139 determines whether the data signal is currently being received. If the data signal is not currently being received, control passes to a block 210 which determines whether the data signal equals one. If the data signal is not currently being received and the data signal does not equal one, it indicates that the credit card 48 has not traveled sufficiently far through the groove 137 to begin reading the data signal. Thus, control returns to the block 148 of FIG. 6.

If the block 210 determines that the data signal equals one, control passes to a block 212 which sets a counter equal to five. Control then passes to a block 214. If the block 139 determines that the data signal is currently being received, control also passes to the block 214.

At this point, the interface board 30 does not know whether the credit card 48 is being forward scanned or reverse scanned. Characters are five bits long. So while the interface board 30 is storing the received bits in groups of five, these will be referred to as five-bit groups, not as characters.

The block 214 stores the bit received and decrements the counter set by the block 212 by one after which control passes to a block 216 which determines whether the counter equals zero. If so, this will indicate that five-bits have been stored as a group, as each character of the message received is five-bits in length. If the block 216 determines that the counter does not equal zero, indicating that all five bits of the five-bit group have not yet been received, control returns to the block 148, FIG. 6, to wait for the remaining bits of the five-bit group.

If the block 216 determines that the counter does equal zero, thus indicating the entire five-bit group has been received, control passes to a block 218.

The five-bit groups are stored in the processor's accumulator 219 having eight one-bit storage locations $A_7$-$A_0$ and a carry location C, as indicated in FIG. 17. A bit is stored in the accumulator 219 first by entering it in the carry location and then shifted to the location $A_7$. When the next bit is entered in the carry location and shifted, the preceding bit in location $A_7$ is shifted to the right one location, i.e. to location $A_6$.

When a five-bit group is initially stored in the accumulator 219, the first bit received is stored in location $A_3$. The next four bits are stored in locations $A_4$-$A_7$, respectively and thus, in a forward scan location $A_3$ would contain bit B0, and location $A_7$ would contain parity bit P. It would not necessarily be exactly reversed for a reverse scan, because of the difficulty of determining the end of the LRC character.

Returning to FIG. 9, the block 218 rotates the bits in the accumulator to the right three locations which shifts the bits of the five-bit groups to the locations $A_4$-$A_0$ and clears the bits $A_7$-$A_5$ of the accumulator 219. After the block 218 has rotated the bits three locations to the right, control passes to a block 220 which determines whether all of the five right-most bits are zeros.

If the block 220 determines that the bits are not all zeros, control passes to a block 222. The block 222 clears a stop character flag and control passes to a block 24 which stores the five-bit character in the second RAM 94 and resets the counter to 5 for the next group of bits. Control then returns to the block 148 of FIG. 6.

If the block 220 determines that all the bits are zeros, control passes to a block 230 which determines whether the stop character flag is set. If the stop character flag is not set, thus indicating that the preceding group of bits were not all zeros, control passes to the block 232 which sets the stop character flag and control passes to the block 224. If the stop character is set, indicating that the preceding group of bits were also all zeros, control passes to a block 233. Thus according to this routine of blocks 220, 222, 230 and 232, the first time that two sequential, five-bit groups, each comprising all zeros are received, control will pass to a block 234.

The routine of the blocks 220, 222, 230 and 232 is provided because of the potential for a reverse scan. Data begins in a forward scan when the data signal initially changes state from zero to one. In a reverse scan, because the trailing bits of the LRC character potentially can be zeros, the five-bit groups stored in the second RAM 94 are likely to be out of synchronization with the actual characters stored on the second magnetic stripe 52b. Thus there exists a possibility that five zeros will be received in a row. For example, if the characters one (10000) $B_o$-P and four (00100)$B_o$-P are side by side, in a reverse scan mode, the bits B1 and B0 of the character four are zeros and the bits P, B3 and B2 of the character one are also zero. However, two adjacent groups of bits, each comprising all zeros, will never sequentially occur except at the end of the data signal. Thus, it is the presence of two sequential five-bit groups, each comprising all zeros, that confirms the end of the data signal.

Once the block 230 determines that two characters each comprising all zeros are side by side, thus indicating termination of the data signal, control passes to the block 233. The block 233 determines the number of characters previously stored in the RAM 94 by the block 224. Control then passes to the block 234 which cycles until termination of the card present signal, indicating removal of the credit card 48 from the groove 137.

Upon removal of the credit card 48, control passes to a block 236 which determines whether the message length is less than or equal to forty characters. According to ANSI standards, messages in the second data track 52b are no greater than forty characters in length. Thus if more than forty characters have been stored, an error must have occurred, and control passes to the block 182, FIG. 8.

If the block 236 determines that the message length is less than or equal to forty characters, control passes to the block 238 which determines whether the first five-bit group received comprises a start character. As illustrated in FIG. 15, the start character as stored on the second data track 52b, BO-P, equals 11010. If the first character is not this pattern of 11010, this confirms that the scan was a reverse scan and control passes to the block 240, FIG. 10.

However, even if the first five-bit group does comprise a start character, it does not necessarily mean that the scan was a forward scan. It could simply be a reverse LRC character or a combination of a reverse LRC character and a reverse stop character. Thus a block 241, FIG. 9, determines whether the second character stored comprises a stop character (i.e., all ones). This would confirm a reverse scan and control would pass to the block 240, FIG. 10. However, if the second character is not a stop character, this confirms that the scan was a forward scan and control passes to a block 254, FIG. 10.

If determined to have been a reverse scan, the five-bit groups ar likely to be out of synchronization with the characters as actually stored. The block 240 sets a counter, equal to eight and loads the last five-bit group received in locations $A_4$-$A_0$ of the accumulator 219. Because the data was received in a reverse scan mode, at least some of the bits in the five-bit group are actually from the start character.

The block 242 then rotates the bits stored in the accumulator 219 left one bit at a time, decreases the counter and control passes to the block 244. The block 244 determines whether the bit in the carry equals one. If the bit in the carry does not equal one, control loops back to the block 242 wherein the bits in the accumulator are again shifted one to the left. Blocks 242 and 244 are searching the accumulator from the left to the right ($A_7$-$A_0$) to locate the first bit equalling one. Once the first bit to equal one has been located, the lead bit of the start character, B0 will have been determined.

Once the block 24 has located the first bit equalling one, control passes to the block 246 which determines whether the counter of the block 242 equals zero. If the block 246 determines that the counter does not equal zero, the data in the accumulator is rotated left on bit by a block 248, causing the most significant bit to appear in the carry location and the counter is decremented by one. A block 250 then takes the bit in the carry and begins storing it as a five-bit word in conjunction with the first bit that equalled one, after which control passes to a block 252 which compares the number of 5-bit words thus being stored to the original character counter of block 233 to determine whether the end of the track 2 data has been reached. If not, control loops back to the block 246, and this loop comprising the blocks 246, 248, 250 and 253 continues until block 242 indicates that all of the track 2 data has been analyzed.

When the block 246 determines that the counter equals zero, the prior byte is read by the block 253 from the second RAM 94. This byte is then rotated left three bits by the block 253 because the left three-most bits of the byte are meaningless, as described above, and the bit counter is set to 5. Control then passes again to the block 248. This loop continues until the block 252 determines that the entire message has been stored. Block 255 appends zero's to the last character (LRC) until the bit counter equals zero, thereby adjusting for the non-synchronization due to a reverse scan. At this point the message has been placed in forward scan format, and control passes to the block 254.

The block 254 performs an exclusive-or test of all bytes of the data to confirm the LRC character. A block 256 determines whether the LRC character check test was passed and, if an error is determined, control returns to the block 182, FIG. 8. However, if no error is determined, control passes to the block 260 which performs a parity check test on every byte of the data and block 262 determines whether a parity error occurred in the parity check.

If such an error did occur, control passes back to the block 182, FIG. 8. If no parity error occurred, a block 264 confirms whether the second to last character equals a stop character and, if it does not, control returns to the block 182, FIG. 8. However, if the second to last character does equal a stop character, control passes to a block 266 of FIG. 11.

Thus, the routine of the blocks 254, 256, 260, 262 and 264 simply perform various data tests on the data to confirm its accuracy.

Figure 11:
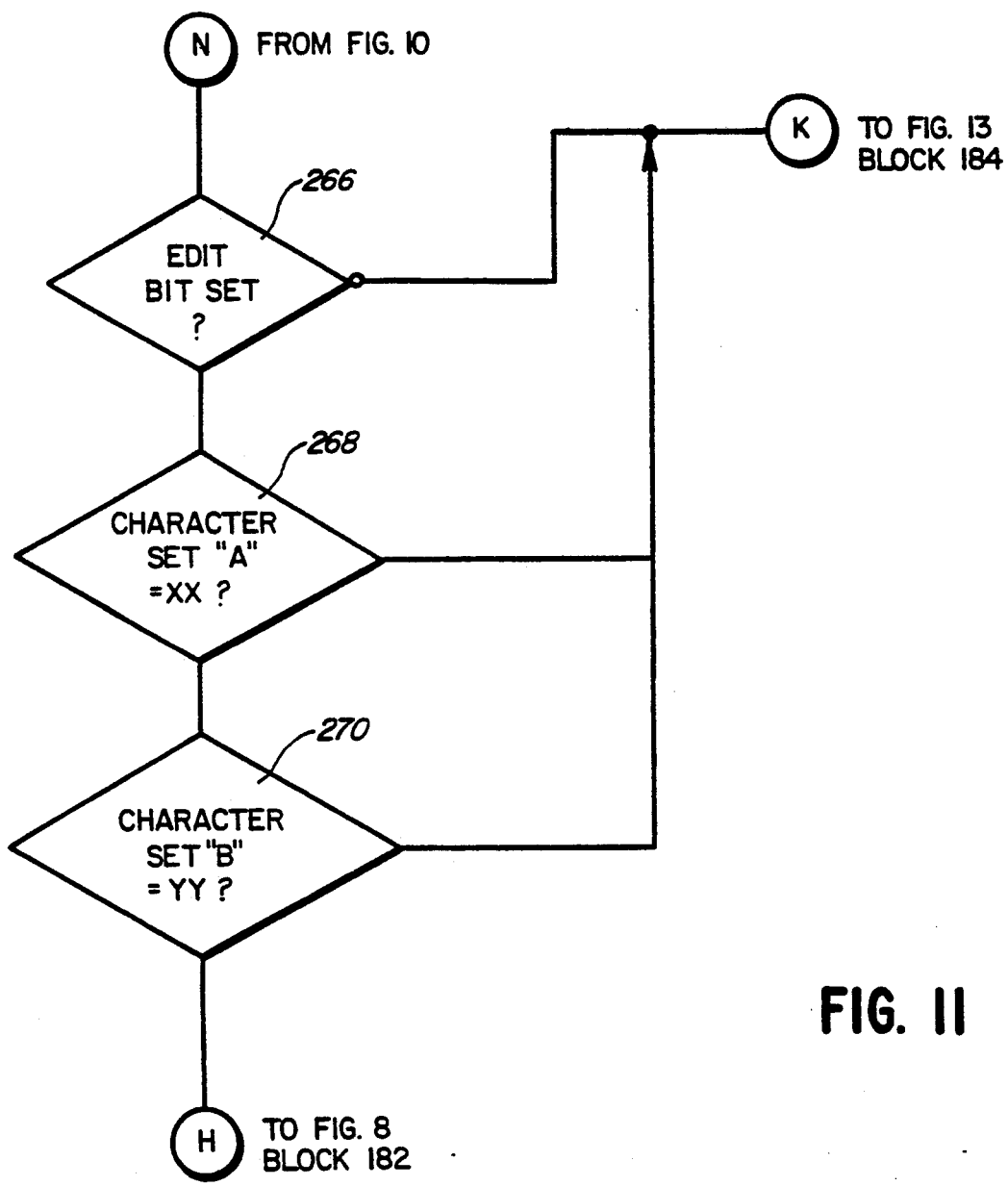

A routine to determine from the scan of the credit card 48 whether the credit card 48 is acceptable has been illustrated in FIG. 11.

A block 266 determines whether an edit bit has been set. The edit bit is a flag in the system which is set if only certain credit cards are to be accepted, or if only the correct type of credit cards will be used. Thus if the block 266 determines that the edit bit has not been set, control passes to the block 184 of FIG. 13.

According to the embodiment described herein, two charge cards are allowed. Each charge card includes a particular first identifier in its respective text field. The block 268, FIG. 11, determines whether one of the first identifiers is present and, if so, control passes to the block 184 of FIG. 13.

If the block 268 determines that one of the first identifiers is not present, a block 270 determines whether a second identifier is present. If not, an error is indicated and control returns to the block 182, FIG. 8. If the block 270 determines that the second identifier is present, control passes to the block 184 of FIG. 13.

As indicated above with respect to FIG. 6, the blocks 140, 144 and 146 determine whether data is to be transferred from one of the first, second or third serial ports 80, 82, 84, respectively. If so, control passes to the block 142, FIG. 12 which first determines whether this data is from the third serial port 84. If so, control passes to the block 184 of FIG. 13. According to this embodiment, no peripheral device is coupled to the third serial port 84. Rather, it is provided for future expansion.

If the block 142, FIG. 12, determines that the data is not from the third serial port 84, control passes to a block 280. Because the only two remaining serial ports are coupled to bar code readers, the data must be from a bar code reader. Therefore, the format of the data must be determined.

The block 280 determines whether the data includes a character representing dollar sign ($). If so, control passes to a block 282 which strips the decimal point from this price field data, and control passes to a block 284. If the block 280 determines that there is no character representing a dollar sign in the data, control passes directly to the block 284.

The block 284 determines whether the data is from the second serial port 82. If so, control passes to the block 286 which determines whether the data is one of two bar codes. The first is commonly referred to as "3" of "9" code and the second is commonly referred to as "128" code. The three of nine code and the 128 code each include a character representing an asterisk (*) identifier, which is stripped by a block 288, and control passes to the block 184, FIG. 13. If the block 286 determines that the data is not 3 of 9 code or 128 code, the code must be UPC code. Control then passes to a block 290 which adds a period character as an identifier after which control passes to the block 184, FIG. 13.

Referring back again to the block 284, if the block 284 determines that the data is not from the second serial port 82, control passes to a block 292. This block 292 determines whether the data is from the bar code reader 32 via the decoder 86. If not, an error must have occurred as there are no other peripherals from which the data could have come, and control then passes to the block 182, FIG. 8.

If it is determined to be decoder data, control passes to the block 294 which determines whether the data is encoded as UPC code or not. If the code is determined to be UPC code, control passes to the block 290, but if the code is determined not to be UPC code, control passes to a block 296 which determines whether the data is three of nine code. If so, control passes to the block 184, FIG. 13, but if the block 296 determines that it is not three of nine code, control passes to a block 298.

Figure 13:
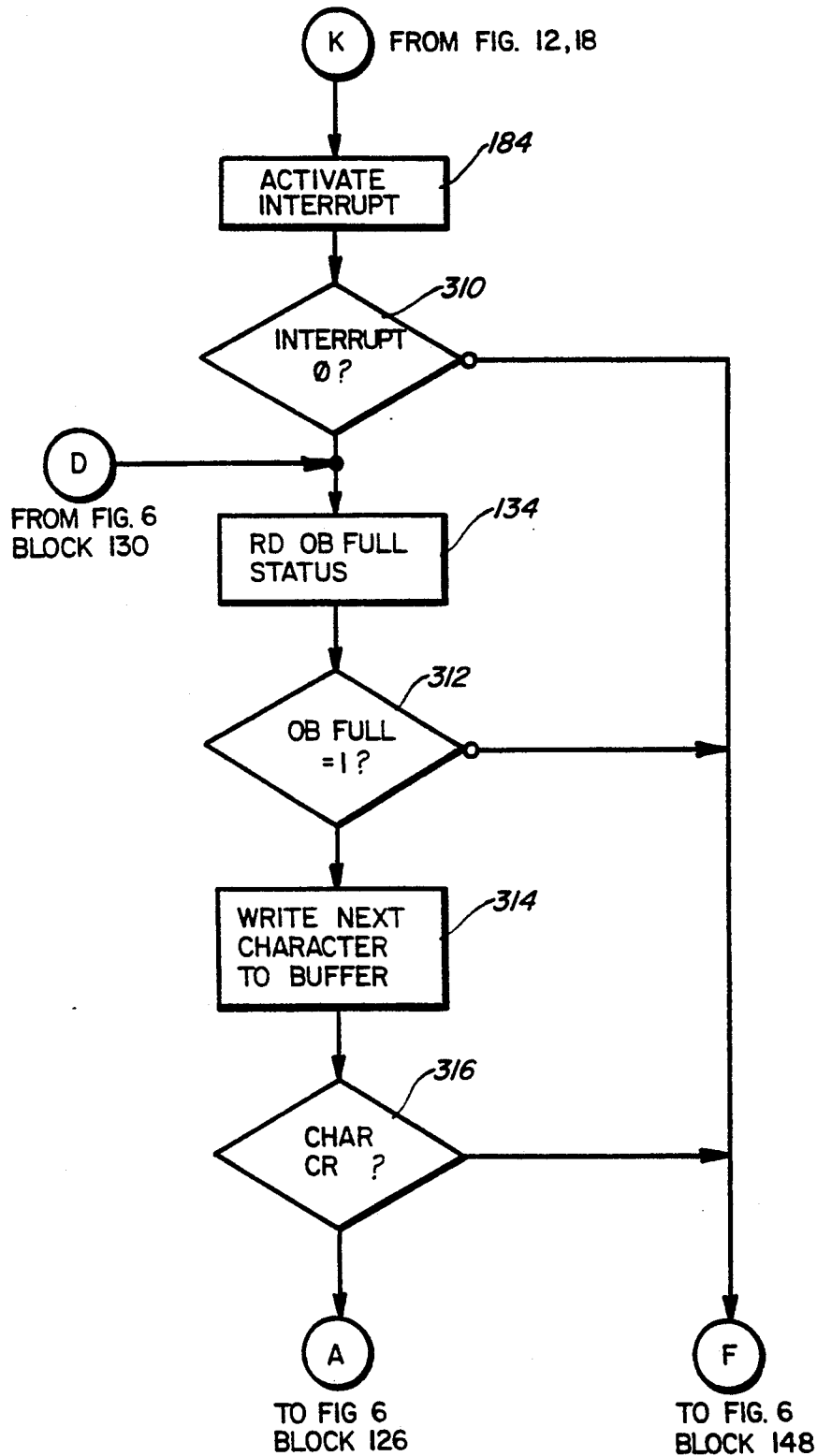

If the block 298 determines that the data is not 128 code, control passes to the block 184, FIG. 13. If the block 298 determines that the code is 128 code, a block 300 determines whether the first character indicates that the data comprises a telephone number which allows a bar code reader to dial a phone number that has been bar code encoded. If the block 300 determines that the first character is a phone number character, control passes to the block 180, FIG. 8. If the block 300 determines that the first character is not a phone number, control passes to a block 302 which determines whether the first character is a test character. If the first character is determined to be a test character by the block 302, a block 304 performs an RS232 turn-around test wherein the second and third serial ports 82, 84 are externally jumpered to perform a communication test. Upon completion of the communication test, control passes to the block 126, FIG. 6.

Referring to FIG. 13, the block 184 causes the interrupt logic device 56 (FIG. 4) to inform the register 28 that data is to be sent from the interface board 30, and control then passes to a block 310. The block 310 determines whether the register 28 is ready to receive the data. If the block 310 determines that the register 28 is not ready to receive the data, control passes to the block 148 of FIG. 6, but if the block 310 determines that the register 28 is ready to receive data, control passes to the block 134 which reads the status of the output character buffer 64.

A block 312 then determines whether the output character buffer 64 (FIG. 4) contains a character. If the output character buffer 64 does contain a character, control passes to the block 148, FIG. 6. However, if the block 312 determines that the output character buffer 64 is empty the next character is written from the second RAM 94 to the output character buffer 64 by a block 314. Control then passes to a block 316 which determines whether the character just written to the output character buffer 64 is a carriage return indicating the end of the message. If it is a carriage return, control passes to the block 126 of FIG. 6 but, otherwise, control passes to the block 148 of FIG. 6.

As will now be apparent, the present invention has achieved the object of providing a register system for facilitating point of sale transactions of any of a plurality of products. The present invention has achieved the further object of providing a bidirectional card reader for reading data stored on a magnetic stripe on a card as a sequence of multi-bit characters of the same bit length. The present invention has achieved the still further object of providing a circuit for permitting a processor having a single serial I/O port including a transmit channel and a receive channel to communicate with a plurality of peripheral devices each having serial I/O ports including a transmit channel and a receive channel.

We claim:

1. In a point of sale terminal for implementing customer transactions and including a point of sale register having a processor with a single input/output (I/O) port, an interface circuit for facilitating transfer of customer transaction data messages between said point of sale register and a peripheral device, said data messages comprising a plurality of sequential characters of data related to a customer transaction, the interface circuit comprising:

electronic circuit memory means for providing temporary storage of characters of data to be transferred between said register and said peripheral device;

first data transferring means operatively coupled between said register single I/O port and said electronic circuit memory means for transferring characters of data between said register and said electronic circuit memory means;

second data transferring means operatively coupled between said electronic circuit memory mans and said peripheral device for transferring characters of data between said electronic circuit memory means and said peripheral device;

message determining mans for determining if a complete customer transaction data message has been received by said electronic circuit memory means; and a programmed processing circuit including a programmed microprocessor operating a control means operatively coupled to said first and second data transferring means and said message determining means for controlling said first and said second data transferring means to begin transferring characters of data for a selected customer transaction data message from said electronic circuit memory means to one of said register or peripheral device virtually immediately after said message determining means determines that a complete data message has been received from the other of said register or peripheral device.

2. The interface circuit of claim 1 wherein said register comprises an NCR 2152 terminal.

3. The interface circuit of claim 1 wherein said peripheral device comprises a bar code reader.

4. The interface circuit of claim 3 wherein said second transferring means includes means for decoding data transferred from said bar code reader to said data storage means.

5. The interface circuit of claim 1 wherein said peripheral device comprises a magnetic stripe reader.

6. The interface circuit of claim 5 wherein said magnetic stripe reader includes means for scanning a magnetic stripe of a card to read characters of data stored in a forward direction as multi-bit sequential characters on said magnetic stripe.

7. The interface circuit of claim 6 including means for reassembling said multi-bit characters when said card is scanned in a reverse direction opposite said forward direction.

8. The interface circuit of claim 1 including:
   means for determining when said register has a data message to be transferred to said peripheral device; and
   means for determining when said peripheral device as a data message to be transferred to said register.

9. In a point of sale terminal for implementing customer transactions and including a point of sale register having a processor with a single input/output (I/O) port, an interface circuit for selectively transferring customer transaction data messages between said register and any one of a plurality of user operated peripheral devices, said data messages comprising a plurality of sequential characters of data related to a customer transaction, said interface circuit comprising:

electronic circuit memory means for providing temporary storage of characters of data to be transferred between said register and any one of said peripheral devices;

first data transferring means operatively coupled between said register single I/O port and said electronic circuit memory means for transferring characters of data between said register and said electronic circuit memory means;

a plurality of second data transferring means each operatively coupled between one of said peripheral devices and said electronic circuit memory means and each for transferring characters of data between said one peripheral device and said electronic circuit memory means;

write determine means operatively associated with all of said second data transferring means for determining with which of said peripheral devices characters of data are to be transferred by said second data transferring means;

message determining means for determining if a complete customer transaction data message has been received by said electronic circuit memory means; and a programmed processing circuit including control means operatively coupled to said first and said second data transferring means and said message determining means for controlling said first and said second data transferring means to begin transferring characters of data for a select customer transaction data message from said electronic circuit memory means to one of said register or peripheral device virtually immediately after said message determining means determines that a complete customer transaction data message has been received from the other of said register or peripheral devices.

10. The interface circuit of claim 9 wherein one of said peripheral devices comprises a bar code reader.

11. The interface circuit of claim 10 wherein said second transferring means includes means for decoding data transferred from said bar code reader to said data storage means.

12. The interface circuit of claim 5 wherein one of said peripheral devices comprises a magnetic stripe reader.

13. The interface circuit of claim 12 wherein said magnetic stripe reader includes means for scanning a magnetic stripe of a card to read characters of data stored in a forward direction as multi-bit sequential characters on said magnetic stripe.

14. The interface circuit of claim 13 including means for reassembling said multi-bit characters when said card is scanned in a reverse direction opposite said forward direction.

15. The interface circuit of claim 9 further comprising means for coupling said register to a telephone line, and means for generating a predetermined touch-tone signal on said telephone line.

16. The interface circuit of claim 9 wherein said register comprises an NCR 2152 terminal.

17. An interface circuit for a point of sale register for selectively transferring data between said register and any one of a plurality of peripheral devices, wherein at least one of said peripheral devices comprises a magnetic stripe reader, said interface circuit comprising:

data storage means for storing data;

first means for transferring data between said register and said data storage means;

means for determining one of said peripheral devices to which data is to be transferred to or rom;

second means for transferring data between the determined one of said peripheral devices and said data storage means, including means associated with said magnetic stripe reader for scanning a magnetic stripe of a card to read data stored as multi-bit sequential characters on said magnetic stripe, means for determining if a card was scanned in a forward or reverse direction, and means for reformatting said multi-bit characters in a generally reverse direction when said card is scanned in a reverse direction opposite said forward direction; and control means operatively coupled to said first and second transferring means for selectively controlling said first and second transferring means to transfer data from said data storage means to one of said register or peripheral devices after receipt from the other of said register or peripheral devices.

18. The interface circuit of claim 17 wherein said control means includes a processor having a single I/O port comprising a transmit channel and a receive channel and the peripheral devices each having a single I/O port comprising a transmit channel and a receive channel, the circuit permitting the processor to communicate with the peripheral devices, the interface circuit having:

read determine means coupled to said processor and said peripheral devices for determining which of said peripheral devices has data to be transferred to said processor;

write determine means operatively associated with said processor for determining to which of said peripheral devices data is to be transferred;

device select means coupled to and controlled by said processor responsive to said read and write determining means for selecting which of said peripheral devices should be coupled with said processor; and switching means comprising first means for selectively coupling said transmit channel of said processor to said receive channel of the coupled one of said peripheral devices and second means for selectively coupling said receive channel of said processor to said transmit channel of the coupled one of said peripheral devices, said switching means being controlled by said device select means.

* * * * *